(12) United States Patent
Sagi-Dolev

(10) Patent No.: US 6,231,346 B1
(45) Date of Patent: May 15, 2001

(54) INTERACTIVE HATCHING EGG

(75) Inventor: Alysia M. Sagi-Dolev, Matan (IL)

(73) Assignee: Snubelgrass Interactive Ltd., Matan (IL)

( * ) Notice: Subject to any disclaimer, the term of this patent is extended or adjusted under 35 U.S.C. 154(b) by 0 days.

(21) Appl. No.: 09/455,342

(22) Filed: Dec. 6, 1999

(51) Int. Cl.$^7$ .................................................. G09B 23/00
(52) U.S. Cl. ......................... 434/295; 434/225; 446/73; 446/487
(58) Field of Search .................................. 434/225, 295; 446/73, 76, 268, 297, 303, 487, 491

(56) References Cited

U.S. PATENT DOCUMENTS

| | | |
|---|---|---|
| D. 312,845 | 12/1990 | Matsuda . |
| 608,794 | 8/1898 | Quinn . |
| 685,345 | 10/1901 | Perkins . |
| 3,091,053 | 5/1963 | Growald . |
| 3,787,599 | 1/1974 | Castanis . |
| 4,237,649 | 12/1980 | Goldfarb . |
| 4,698,043 | 10/1987 | May . |
| 4,881,915 | 11/1989 | Liaw . |
| 5,413,332 | 5/1995 | Montgomery . |
| 5,545,069 | * 8/1996 | Glynn et al. .................. 446/76 X |
| 5,795,209 | * 8/1998 | Moore ............................. 446/73 |
| 5,813,895 | 9/1998 | Cho . |
| 5,989,092 | 11/1999 | McGowan . |

* cited by examiner

*Primary Examiner*—John A. Ricci
(74) *Attorney, Agent, or Firm*—Natter & Natter

(57) ABSTRACT

An interactive hatching egg provides a learning experience for children. The egg is formed of upper and lower sections joined along a plane transverse to the longitudinal axis of the egg. The lower section carries a power supply, a controller having an input coupled to a touch sensor and outputs coupled to a motive drive, an illumination source and a sound generator. The controller is programmed to initiate a cycle upon detecting when the egg is touched, with the cycle including sound and light patterns. The cycle concludes with the motive drive actuating a latch which releases a hatch lid contoured in the upper shell to expose a baby animal. Upon detecting the egg being touched during a cycle, the controller alters the sound and/or light patterns.

27 Claims, 4 Drawing Sheets

INTERACTIVE HATCHING EGG

BACKGROUND OF THE INVENTION

1. Field of the Invention

This invention relates generally to toys which provide learning experiences and more particularly to a toy which simulates the hatching of an egg.

2. Antecedents of the Invention

Hatching egg toys have been proposed heretofore as, for example, in U.S. Pat. No. 5,813,895 issued to CHO and U.S. Pat. No. 4,881,915 issued to LIAW. U.S. Pat. No. 5,813,895 disclosed an egg shell with sections joined together by a liquid soluble medium such that when the egg was immersed in liquid, the shell sections separated and a toy figure was revealed. Similarly, U.S. Pat. No. 4,881,915 also disclosed a liquid activated hatching egg wherein water, which entered the egg, caused a compressed foam animal carried within the egg to expand, breaking through weakened fault lines of the egg.

These toys merely provided amusement; significantly lacking was a meaningful learning experience.

SUMMARY OF THE INVENTION

An interactive hatching egg is formed of a shell comprising a pair of shell sections which are joined along a plane extending transversely through the egg.

Depending from the upper shell section into the lower shell section is a generally planar circular chassis with a peripheral side wall. A bracket extending downwardly from the bottom of the chassis carries a power supply and a keyway for receiving an axial retention post. Mounted to the chassis and within an enclosure defined by the chassis side wall and a cover plate, is a circuit board having a controller, e.g. a microprocessor. Illumination devices, a sound generator and a motive drive, which is coupled to a drive train for engaging a spring latch, are also carried within the enclosure. The spring latch releases a hatch lid formed in the upper shell section for simulating a hatching egg experience and exposing a baby animal which is positioned in the upper shell section, seated upon the chassis cover.

A pair of contact surfaces are provided on the lower shell section in communication with the controller for sensing when the egg is touched. The controller is programmed to initiate a hatching cycle upon sensing that the egg has been touched, with the hatching cycle being of a predetermined duration and terminating with the hatch lid being released. During the cycle, the illumination devices and a sound generator are actuated in one or more patterns with the patterns varying in response to the egg being touched.

From the foregoing compendium, it should be appreciated that it is an aspect of the present invention to provide an interactive hatching egg of the general character described which is not subject to the disadvantages of the antecedents of the invention aforementioned.

A feature of the present invention is to provide an interactive hatching egg of the general character described which instills in children caring instincts.

Another aspect of the present invention is to provide an interactive hatching egg of the general character described which is well-suited for preschool age children.

A consideration of the present invention is to provide an interactive hatching egg of the general character described which is simple to use.

Another consideration of the present invention is to provide an interactive hatching egg of the general character described which fosters nurturing instincts.

A further feature of the present invention is to provide an interactive hatching egg of the general character described which is well-suited for unsupervised child play.

Yet another aspect of the present invention is to provide an interactive hatching egg of the general character described which promotes development of tactile and auditory senses in children.

A further consideration of the present invention is to provide an interactive hatching egg of the general character described which fosters association of tactile and visual senses in children.

A still further consideration of the present invention is to provide an interactive hatching egg of the general character described capable of maintaining a child's attention.

To provide an interactive hatching egg of the general character described which is suitable for economical low cost mass production fabrication is a still further consideration of the present invention.

Another feature of the present invention is to provide an interactive hatching egg of the general character described with internal components being inaccessible to young children.

A still further feature of the present invention is to provide an interactive hatching egg of the general character described which is responsive to being touched by a child.

An additional feature of the present invention is to provide an interactive hatching egg of the general character described which is durable and well-suited for preschool as well as school age play environments.

Yet another consideration of the present invention is to provide an interactive hatching egg of the general character described which is well suited for usage by people of all ages.

Other aspects, features and considerations in part will be obvious and in part will be pointed out hereinafter.

With these ends in view, the invention finds embodiment in the various combinations of elements, arrangements of parts and series of steps by which the said aspects, features and considerations are attained, all with reference to the accompanying drawings, and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
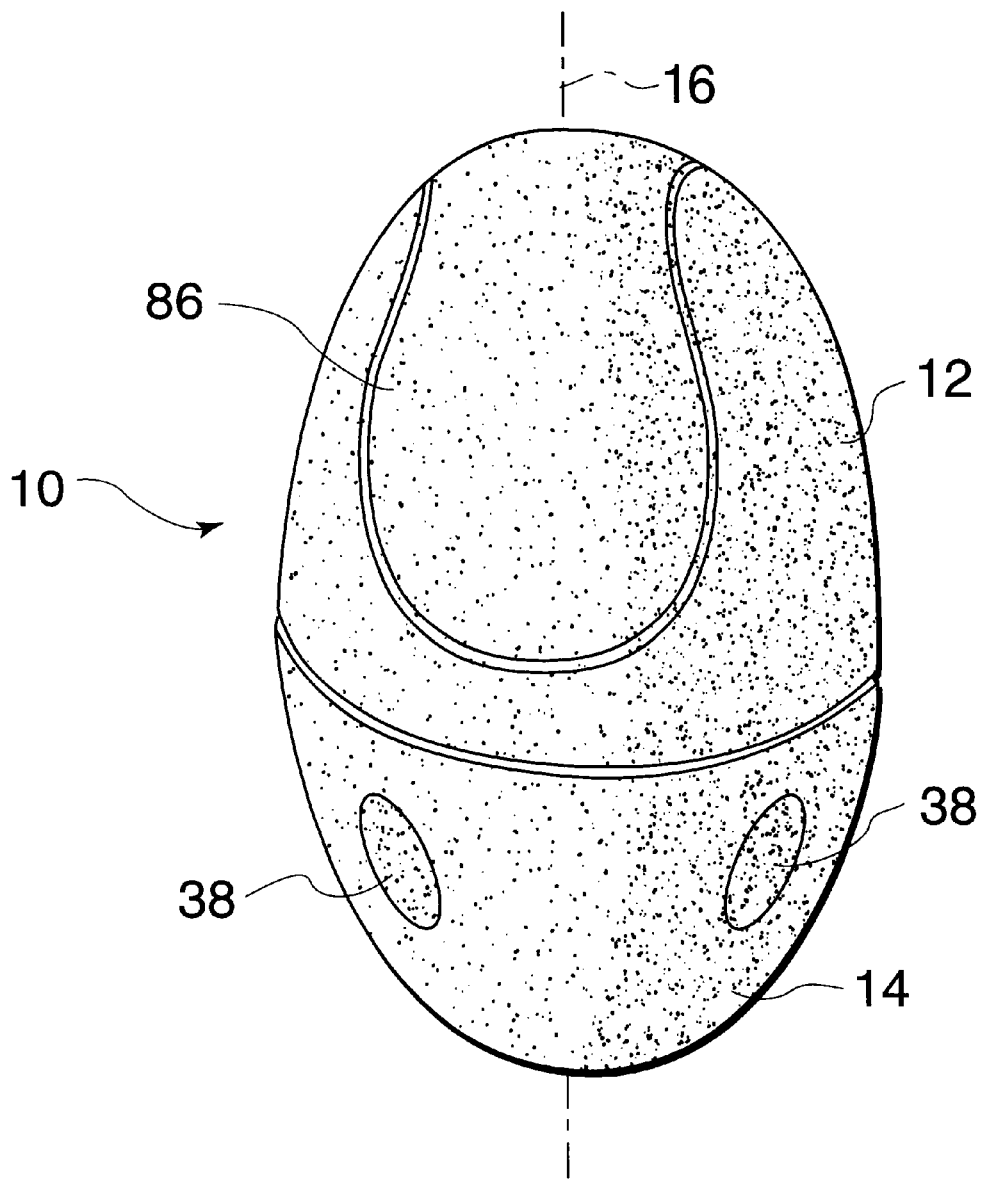
FIG. 1 is a perspective view of an interactive hatching egg constructed in accordance with and embodying the invention and showing an upper and a lower section with the upper section having a hatch lid which is operable to expose a baby animal and with the lower section including a pair of sensors for detecting when the egg has been touched.

Referring now in detail to the drawings, the reference numeral 10 denotes generally an interactive hatching egg constructed in accordance with and embodying the invention, the egg includes an upper shell section 12 and a lower shell section 14 joined along a plane which is transverse to a longitudinal axis 16 of the egg. The shell sections 12, 14 are preferably molded of a suitable thermoplastic and in accordance with the invention, at least a portion of the upper section 12 is somewhat translucent.

Carried within the lower section 14 is a circular, generally planar chassis having a peripheral side wall 20. A cover plate 22 is positioned over the upper edge of the side wall 20 to provide an enclosure.

Figure 2:
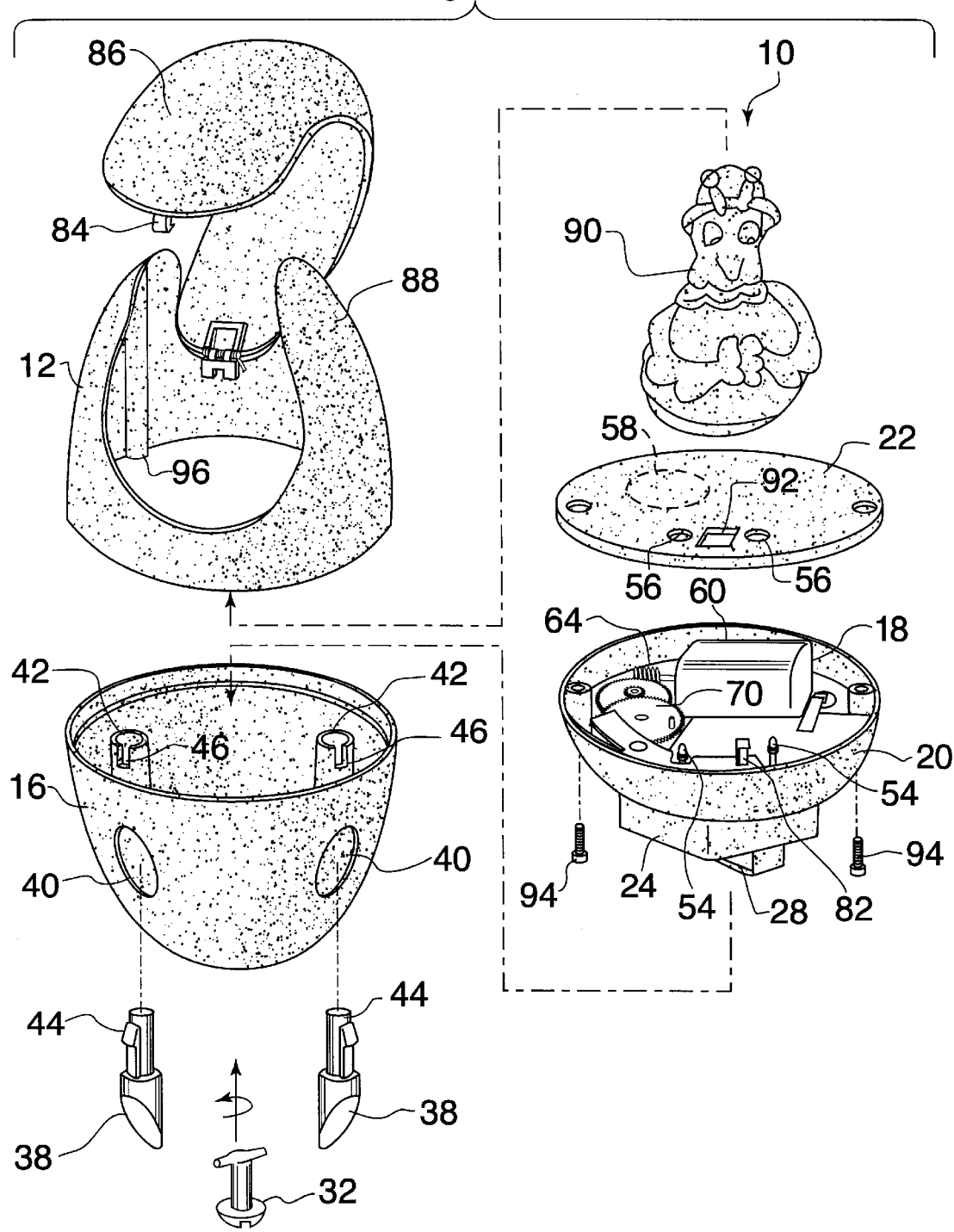
FIG. 2 is an exploded view of the interactive hatching egg and showing the hatch lid in its open position and a chassis, which fits within the lower section.
Figure 3:
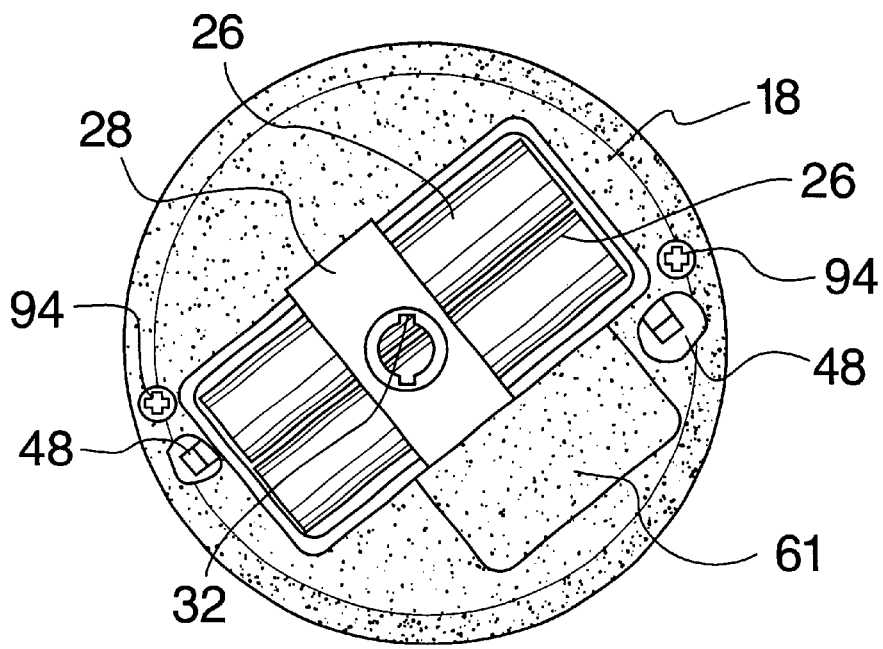
FIG. 3 is a bottom view of the chassis and showing a bracket for carrying a power supply, a keyway for receiving an axial retention post and a depression formed on the top face of the chassis for receiving a motive drive.
Figure 4:
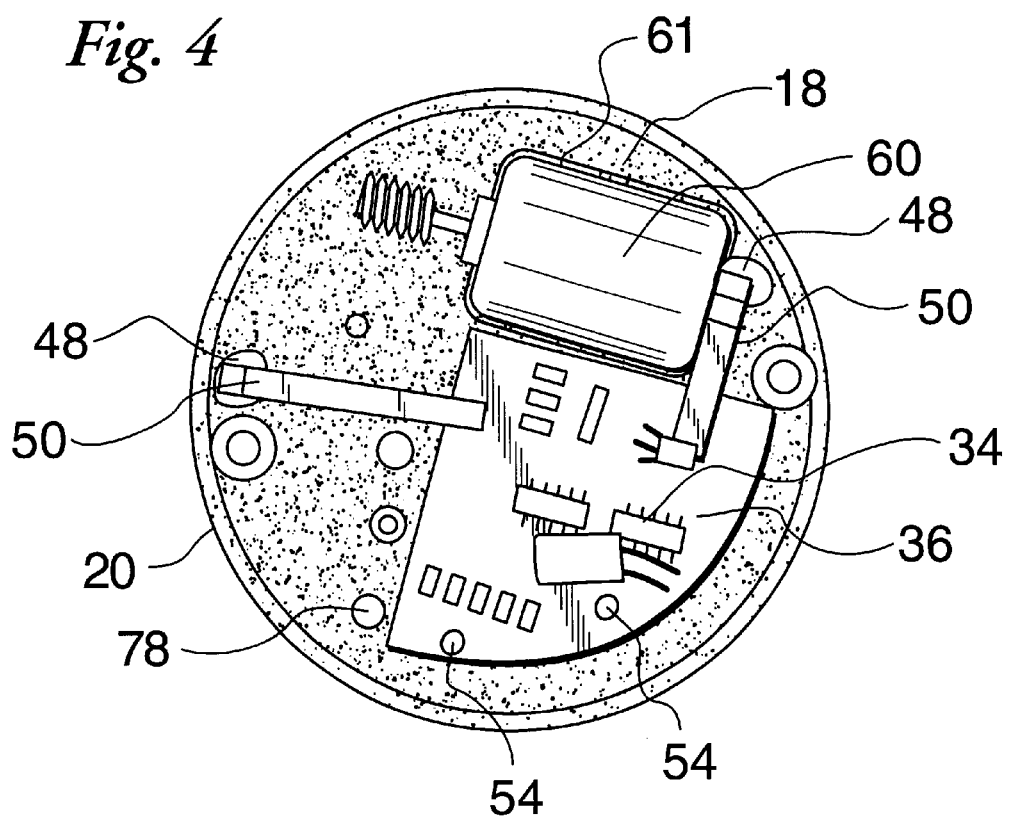
FIG. 4 is a top plan view of the chassis, with portions deleted for clarity and showing a circuit board mounted to the chassis with a controller on the board.

Extending from the bottom of the chassis 18, as illustrated in FIGS. 2 and 3, is a power supply bracket 24 which carries, for example, a pair of batteries 26. Projecting downwardly from the bracket 24 is a transverse web 28 having a central keyway opening 30 for receiving a retention post 32 which extends upwardly from an axial aperture at the bottom of the lower section 14. The post 32 is engaged in the keyway 30 to retain the chassis within the lower section 14 and fix the upper section 12 to the lower section 14.

Mounted on the chassis 18 is a controller 34 carried on a circuit board 36. In accordance with the invention, the controller 34 is operatively connected to one or more touch sensors 38 having engagement surfaces contoured to mate with the lower section 14. The touch sensors are received within sockets 40 formed in the lower section and which extend in a generally axial direction. The upper portion of each sensor 38 is received in a cylindrical sleeve 42 and a radial branch 44 of each sensor 38 engages a cutout notch 46 of each sleeve 42, to lock the sensors 38 in position. The sensors 38 are formed of or coated with a conductive material and the upper end of each sensor 38 extends to and is registered with a chassis aperture 48. A contact plate 50 extends from the board 36 to each of the sensors 38, with contact being completed through the apertures 48.

A sensor circuit 52, mounted to the board 36, is coupled to the plates 50 and generates a signal upon detecting contact between a child's hands and the touch sensors 38. Any of a number of known sensor circuits may be employed including capacitive, current flow, etc. Additionally, the touch sensors may comprise one or more pressure sensitive switches.

Also coupled to the controller 34 are a plurality of, output devices including an illumination device or devices 54, which may comprise a light emitting diode or diodes, an electroilluminescent wire or panel or any other known illumination output device. It should be noted that apertures 56 for the illumination devices 54 are provided in the cover plate 22, such that illumination will be viewable through the translucent portion of the upper section 12.

Also coupled to the controller 34 is a sound generator output device 58 which may comprise, for example, a piezoelectric device mounted to the underside of the cover plate 22 and coupled to the controller 34 by suitable electrical leads (not shown). A further output device coupled to the controller 34 is a motive drive 60, illustrated in an exemplary manner as an electric motor. It should be appreciated that any various electromechanical drives may be utilized, such as, a linear motor or solenoid. The electric motor is carried in a depression 61 of the chassis 18.

Figure 5:
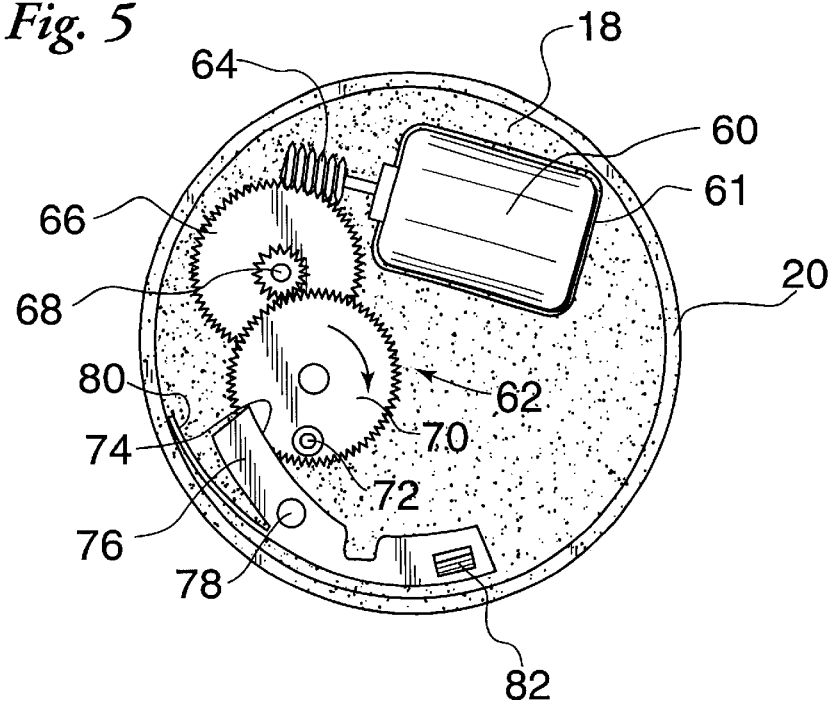
FIG. 5 is a top plan view of the chassis, with portions deleted for clarity and illustrating a gear train driven by the motive drive for releasing a spring latch.
Figure 6:
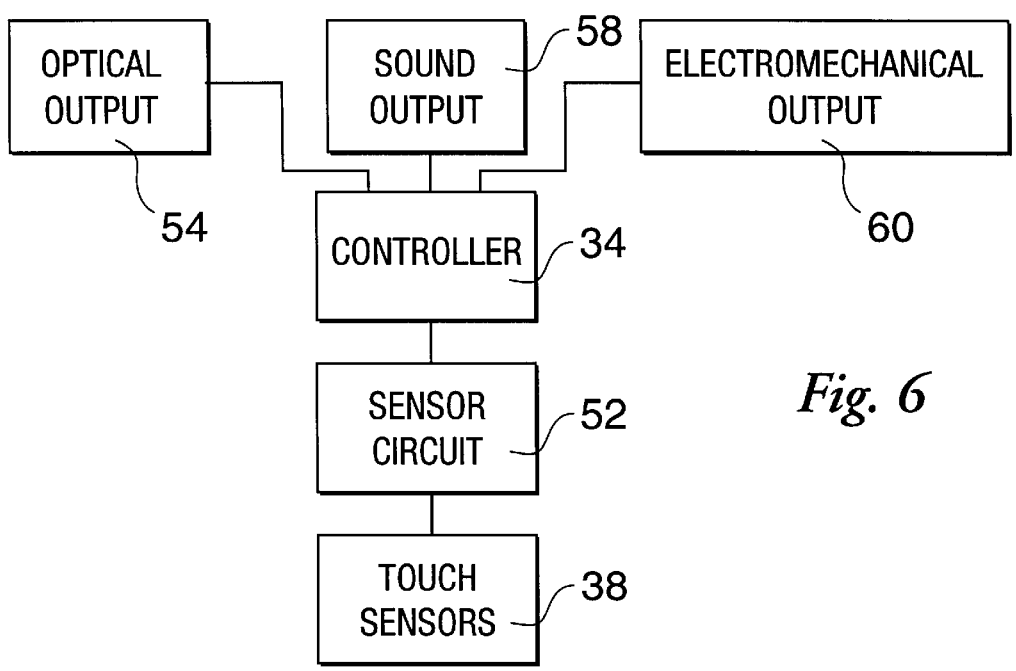
FIG. 6 is a simplified block diagram of the controller operating system showing input and output devices.

Referring now to FIG. 5, a typical drive train 62 is illustrated for instances wherein the motive drive 60 comprises an electric motor. The drive train 62 includes a worm gear 64 coupled to a motor shaft, with the worm gear 64 driving a spur gear 66. A pinion 68, concentrically mounted to the spur gear 66, drives a further spur gear 70. A post 72, extending axially from the spur gear 70, engages a cam 74 on a latch plate 76. The latch plate 76, is pivotally mounted to an axial post 78, extending from the chassis 18.

Engagement between the post 72 and the cam 74 causes the latch plate 76 to rotate in a counter clockwise direction about the post 78, against the bias of an integral leaf spring 80, causing a latch 82 to move inward in a substantially radial direction.

The latch 82 thus disengages from a mating latch 84 which is fixed to a translucent hatch lid 86 formed in the upper section 12. When the latches 82, 84 are disengaged, the hatch lid 86 swings from its closed position, shown in FIG. 1, to its open position, shown in FIG. 2, about a spring biased hinge 88 to expose a toy baby animal 90, seated on the cover plate 22.

In manufacture of the interactive hatching egg 10 in accordance with the invention, after the chassis components have been assembled, the lid is positioned such that the apertures 56 are registered with the illumination devices 54 and the latch 82 projects through a rectangular opening 92. With the components thus registered, a pair of screws 94 are extended through registered openings in the chassis 18 and the cover 22; the screws 94 are anchored in sockets 96, formed in the upper section 12. The chassis is thus fixed to the upper section 12 and extends downwardly therefrom.

Thereafter, the upper and lower sections are registered such that the touch sensors 38 are registered with the chassis openings 48. The upper and lower sections are then urged together and locked in position by rotation of the retention post 32 in the keyway 30.

Pursuant to the invention, the controller 34 is programmed to initiate a hatching cycle upon receiving a first signal from the sensor circuit 52, indicating that the egg 10 has been touched by a child. The hatching cycle may extend for any predetermined duration, e.g. from one hour or less to twenty four or forty eight hours.

At the end of the hatching cycle, the motive drive 60 is actuated to disengage the latches 82,84 such that the hatch lid 86 swings open, exposing the toy baby animal 90 which then may be removed from the egg.

During the hatching cycle, the controller program actuates the illumination devices 54 in various patterns and also actuates the sound generator 58 to produce various sounds. The actuation of the illumination devices 54 and sound generator 58 may be continuous or intermittent. The types of sounds and duration thereof is predetermined pursuant to the controller program.

Upon receiving a signal from the sensor circuit 52 that the egg has been touched during a hatching cycle, which would occur if a child handled the egg in a nurturing or caring manner, the controller 36 is programmed to vary the intensity and/or pattern of its actuation of the illumination devices and/or sound generator so that the child receives a responsive feedback.

The controller 34 may also be programmed to vary the hatching cycle, e.g. shorten the cycle duration in response to a signal or signals indicating that the egg has been touched during a cycle.

An alternate program for a hatching cycle is for the controller to actuate the illumination devices and/or sound generator only if the egg is touched during a hatching cycle or to provide intermittent actuation, e.g. at commencement and/or end of the cycle if the egg is not touched as well as actuation when touched.

Thus it will be seen that there is provided an interactive hatching egg which achieves the various aspects, features and considerations of the present invention and which is well suited to meet the conditions of practical usage.

It should be understood that the invention should not be construed as limited in utility. For example, the invention will find usage in adult markets, as for example, as a novelty device, interactive desk ornament or gift dispenser.

Since various possible embodiments might be made of the present invention and since various changes might be made in the exemplary embodiments shown herein without departing from the spirit of the invention, it should be understood that all matter herein described or shown in the accompanying drawings should be interpreted as illustrative and not in a limiting sense.

Having thus described the invention, there is claimed as new and desired to be secured by Letters Patent:

1. An interactive hatching egg, the egg comprising a shell, the shell carrying user accessible contents, a portion of the shell comprising a hatch lid, the hatch lid being operable to reveal the user accessible contents, a controller positioned within the shell, the controller being operatively connected to the hatch lid, the controller being programmed to open the hatch lid upon conclusion of a hatching cycle.

2. An interactive hatching egg constructed in accordance with claim 1 wherein the controller is programmed to initiate the hatching cycle in response to the egg being touched.

3. An interactive hatching egg constructed in accordance with claim 1 wherein the user accessible contents comprises a baby animal.

4. An interactive hatching egg constructed in accordance with claim 1 further including a sound generator positioned within the shell, the sound generator being operatively connected to the controller, the controller being programmed to actuate the sound generator during the hatching cycle.

5. An interactive hatching egg constructed in accordance with claim 4, the controller being programmed to vary the actuation of the sound generator in response to the egg being touched during the hatching cycle.

6. An interactive hatching egg constructed in accordance with claim 1 further including an illumination device positioned within the shell, the illumination device being operatively connected to the controller , the controller being programmed to actuate the illumination device during the hatching cycle.

7. An interactive hatching egg constructed in accordance with claim 6, the controller being programmed to vary the actuation of the illumination device in response to the egg being touched during the hatching cycle.

8. An interactive hatching egg constructed in accordance with claim 6, wherein the hatch lid is translucent, whereby illumination from within the shell can be observed.

9. An interactive hatching egg constructed in accordance with claim 1 further including a motive drive positioned within the shell, the motive drive being mechanically coupled to the hatch lid, the motive drive being operatively connected to the controller, the controller actuating the motive drive to open the hatch lid.

10. An interactive hatching egg constructed in accordance with claim 9 further including a chassis positioned within the shell, the chassis being user inaccessible, the controller and the motive drive being secured to the chassis.

11. An interactive hatching egg constructed in accordance with claim 10, wherein the shell comprises an upper shell section and a lower shell section, the hatch lid being formed in the upper shell section , the chassis being positioned within the lower shell section.

12. An interactive hatching egg constructed in accordance with claim 1 wherein the controller is programmed to respond to the egg being touched during the hatching cycle.

13. A hatching egg comprising an egg shell formed of at least two sections, one of the sections including a hatch lid, user accessible contents being positioned within the one section, the other section including a motive drive connected to the hatch lid for opening the hatch lid to access the user accessible contents, the motive drive being user inaccessible.

14. A hatching egg constructed in accordance with claim 13 further including a chassis, the chassis being user inaccessible and positioned within the other section, a latch mounted to the chassis, the latch being in engagement with the hatch lid when the hatch lid is closed, the motive drive being actuated to disengage the latch from the hatch lid whereby the user accessible contents will become available.

15. A hatching egg constructed in accordance with claim 14 wherein the chassis includes a peripheral wall and a lid forming a chassis enclosure, the motive drive being positioned within the chassis enclosure.

16. A hatching egg constructed in accordance with claim 15 wherein the lid is positioned between the one section and the other section, the one section being positioned above the other section, the user accessible contents being positioned on top of the lid.

17. A hatching egg constructed in accordance with claim 13 wherein the user accessible contents comprises a baby animal.

18. An interactive hatching egg, the egg comprising a shell, the shell carrying user accessible contents, a portion of the shell comprising a hatch lid, the hatch lid being operable to reveal the user accessible contents, a controller positioned within the shell, the controller being operatively connected to the hatch lid, at least one sensor, the sensor having an engagement surface positioned on the exterior of the shell, the sensor being operatively connected to the controller, the controller being programmed to open the hatch lid in response to the engagement surface being touched.

19. An interactive hatching egg as constructed in accordance with claim 18 wherein the controller is programmed to initiate a hatching cycle in response to the engagement surface being touched.

20. An interactive hatching egg constructed in accordance with claim 18 further including a plurality of sensors, each sensor having an engagement surface positioned on the exterior of the shell, each sensor being operatively connected to the controller.

21. An interactive hatching egg as constructed in accordance with claim 18 further including a sound generator positioned within the shell, the sound generator being operatively connected to the controller, the controller being programmed to actuate the sound generator.

22. An interactive hatching egg as constructed in accordance with claim 18, wherein the user accessible contents comprises a baby animal.

23. An interactive hatching egg as constructed in accordance with claim 18 further including an illumination device positioned within the shell, the illumination device being operatively connected to the controller, the controller being programmed to actuate the illumination device.

24. An interactive hatching egg as constructed in accordance with claim 23, wherein the hatch lid is translucent, whereby illumination from the illumination device can be observed through the hatch lid.

25. An interactive hatching egg as constructed in accordance with claim 18 further including a motive drive positioned within the shell, the motive drive being mechanically coupled to the hatch lid, the motive drive being operatively connected to the controller, the controller actuating the motive drive to open the hatch lid.

26. A hatching egg, the egg comprising a shell, the shell carrying contents, a portion of the shell comprising a hatch lid, the hatch lid being operable from a closed position, wherein the contents are inaccessible, to an open position, wherein the contents are user accessible, a latch plate mounted to a post within the shell, a latch carried on the latch plate, the latch plate being spring biased in a direction about the post lo position the latch for maintaining the hatch lid in the closed position, a motor, the motor including an output shaft, a gear train driven by the output shaft, the gear train including a spur gear, a latch plate engagement device carried by the spur gear, rotation of the output shaft causing the spur gear to rotate, rotation of the spur gear resulting in contact between the engagement device and a portion of the latch plate, contact between the engagement device and the portion of the latch plate causing pivotal movement of the latch plate about the post in a direction opposite from the direction of spring bias, the pivotal movement of the latch plate resulting in movement of the latch to a release position whereby the hatch lid attains its open position.

27. A hatching egg as constructed in accordance with claim 25 further including a controller positioned within the shell, the controller being operatively connected to the motor, at least one sensor, the sensor having an engagement surface positioned on the exterior of the shell, the sensor being operatively connected to the controller, the controller being programmed to actuate the motor to open the hatch lid in response to the engagement surface being touched.

* * * * *